(12) United States Patent (10) Patent No.: US 8,877,135 B2
Wang (45) Date of Patent: Nov. 4, 2014

(54) GASEOUS FLUID-OPERATED OZONE SUPPLY UNIT

(75) Inventor: Shiang-Shih Wang, Lukang Township, Changhua County (TW)

(73) Assignee: Geann Industrial Co., Ltd., Lukang Township, Changhua County (TW)

( * ) Notice: Subject to any disclaimer, the term of this patent is extended or adjusted under 35 U.S.C. 154(b) by 197 days.

(21) Appl. No.: 13/598,032

(22) Filed: Aug. 29, 2012

(65) Prior Publication Data

US 2014/0065019 A1 Mar. 6, 2014

(51) Int. Cl.
*B01J 19/08* (2006.01)
(52) U.S. Cl.
USPC ............ 422/186.07; 422/186.03; 422/186; 422/186.12; 422/186.14; 422/4; 204/176
(58) Field of Classification Search
CPC ...... C01B 13/11; C01B 2201/64; B01J 19/12; G05B 11/16
USPC .......... 422/186.07, 186, 186.12, 186.03, 422/186.14, 4, 105; 204/176
See application file for complete search history.

(56) References Cited

U.S. PATENT DOCUMENTS 4,816,229 A * 3/1989 Jensen et al. ............... 422/186.2

* cited by examiner

*Primary Examiner* — Xiuyu Tai
(74) *Attorney, Agent, or Firm* — Egbert Law Offices, PLLC (57) ABSTRACT

A gaseous fluid-operated ozone supply unit includes a housing, output duct, ozone generator, air induction member and controller. The air induction member is located between the air inlet portion and ozone generator of the housing. The output duct has a coupling end and an extension end. The coupling end is connected with the ozone outlet, while the extension end is extended to a preset target for the ozone. The preset target must he capable of guiding the stream so that the output duct could generate negative pressure. The ozone supply unit provided enables to control ozone's opening and closing state through air-operated negative pressure. The ozone supply unit can maintain the flow rate and smoothness of the water supply passage, so as to remove impurities and dirt in water and prevent blocking or even disabling of active magnetic inductor for improved applicability and ease of operation.

8 Claims, 9 Drawing Sheets

GASEOUS FLUID-OPERATED OZONE SUPPLY UNIT

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to a gaseous fluid-operated ozone supply unit, and more particularly to an innovative one which enables to control ozone's opening and closing state through air-operated negative pressure.

2. Description of Related Art Including information Disclosed Under 37 CFR 1.97 and 37 CFR 1.98.

Ozone (molecular formula: $O_3$), an allotrope of oxygen ($O_2$) is able to eliminate instantly planktonic bacteria in the air, decompose toxic gas and remove foul smell, etc, so ozone is widely applied for purification of air, potable Water and sterilization, etc.

There are currently available with a variety of ozone generators, one of which is commonly incorporated onto an existing faucet for purification and sterilization of water supply as discussed in the present invention.

Some problems of a conventional ozone generator start-up structure are still observed in actual applications. For example, as the water flow-induced control structure of a conventional ozone generator is concerned, a reed switch is arranged generally in the water supply passage of the faucet. The water supply passage is internally equipped with a fixed magnet and a movable magnet, and externally provided with an induction switch contact. This structure is operated in such a way that the yielding water pressure pushes the movable magnet to shift towards the fixed magnet correspondingly to the induction switch contact. In such a case, the induction switch contact will be electrically connected due to magnetic force, then the ozone generator is activated. When the water supply is shut down, the movable magnet could be reset via the repellent action of magnetic pole of the fixed magnet, meanwhile the induction switch contact is in open circuit state, allowing to turn off the ozone generator. Yet, as the water flow-induced control structure of the ozone generator is arranged into the water supply passage, the flow rate and smoothness of the water supply passage will be highly affected, and the impurities and dirt in the stream likely lead to unsmooth operation or even locking of the movable magnet. Moreover, there is also a common concern as to whether the movable and fixed magnets in the stream results in water pollution.

Thus, to overcome the aforementioned problems of the prior art, it would be an advancement if the art to provide an improved, structure that can significantly improve the efficacy.

Therefore, the inventor has provided the present invention of practicability after deliberate design and evaluation based on years of experience in the production, development and design of related products.

BRIEF SUMMARY OF THE INVENTION

Based on the innovative design of the present invention wherein the "gaseous fluid-operated ozone supply unit" mainly comprises a housing, output duct, ozone generator, air induction member and controller, the drainage effect generated from water guide will discharge air in the output duct, so that the output duct could generate negative pressure state, enabling to control ozone's opening and closing state through air-operated negative pressure. As compared with prior art wherein the induction-operated control structure is arranged in the water supply passage, the present invention could maintain the flow rate and smoothness of the water supply passage, so as to remove impurities and dirt in water and prevent blocking or even disabling of active magnetic inductor for improved applicability and ease of operation.

Although the invention has been explained in relation to its preferred embodiment, it is to be understood that many other possible modifications and variations can be made without departing from the spirit and scope of the invention as hereinafter claimed.

DETAILED DESCRIPTION OF THE INVENTION

FIGS. 1-5 depict preferred embodiments of a gaseous fluid-operated ozone supply unit of the present invention, which, however, are provided for only explanatory purpose for patent claims. Said gaseous fluid-operated ozone supply unit 05 includes a housing 10, designed to form a hollow holding space 11.

An air inlet portion 20 is set externally or internally on the housing 10, and used to guide external air (set externally on the housing in this preferred embodiment).

An ozone outlet 30 is set on the other location of the housing 10 for ozone output. The ozone outlet 30 is provided with a check valve 31 (only marked in FIG. 1) for irreversible output.

An output duct 40 comprises of a coupling end 41 and an extension end 42. The coupling end 41 is connected with the ozone outlet 30. The extension end 42 is extended to a preset target 06 for the ozone, and the preset target 06 must be capable of guiding the stream so that the output duct 40 could generate negative pressure.

An ozone generator 50 is set into the bolding space 11 of the housing 10 for generating ozone. The ozone generator 50 comprises of an air guiding portion 51, an ozone discharging portion 52 and an ozone generating portion 53 located between the air guiding portion 51 and ozone discharging portion 52. Of which, the ozone discharging portion 52 is connected with the ozone outlet 30.

An air induction member 60 is set between the air inlet portion 20 and ozone generator 50 and comprises of: a guiding pipe 61, set vertically, including a lower inlet end 611, an upper outlet end 612 and a guiding section 613 located between the upper outlet end 612 and lower inlet end 611. Of which, the upper outlet end 612 is connected with the air guiding portion S1 of the ozone generator 50 via a connecting tube 614, and the lower inlet end 611 is connected with the air inlet portion 20.

An active magnetic inductor 62 is arranged into the guiding section 613 of the guiding pipe 61 in a liftable state. A magnetic body 63 is set at one side of the active magnetic inductor 62, and the active magnetic inductor 62 is driven into a floating state when the output duct 40 is under negative pressure state. An induction circuit board 65 with Hall component 64 is set at one side of the guiding pipe 61. Said Hall component 64 is arranged at one side of the induction circuit board 65. When the active magnetic inductor 62 is in a floating state, the magnetic body 63 is aligned with the Hall component 64, such that said Hall component 64 could generate an induction signal.

A controller 70 is set into the holding space 11 of the housing 10 (indicated by FIG. 2), and electrically connected with the induction circuit board 65 and ozone generator 50, enabling startup of the ozone generating portion 53 of the ozone generator 50 when receiving the induction signal of the Hall component 64. Otherwise disabling the ozone generating portion 53 of the ozone generator 50 when the induction signal of the Hall component 64 is not received.

With this design, the present invention has provided an ozone supply unit which enables to control ozones opening and closing state through air-operated negative pressure.

Figure 1:
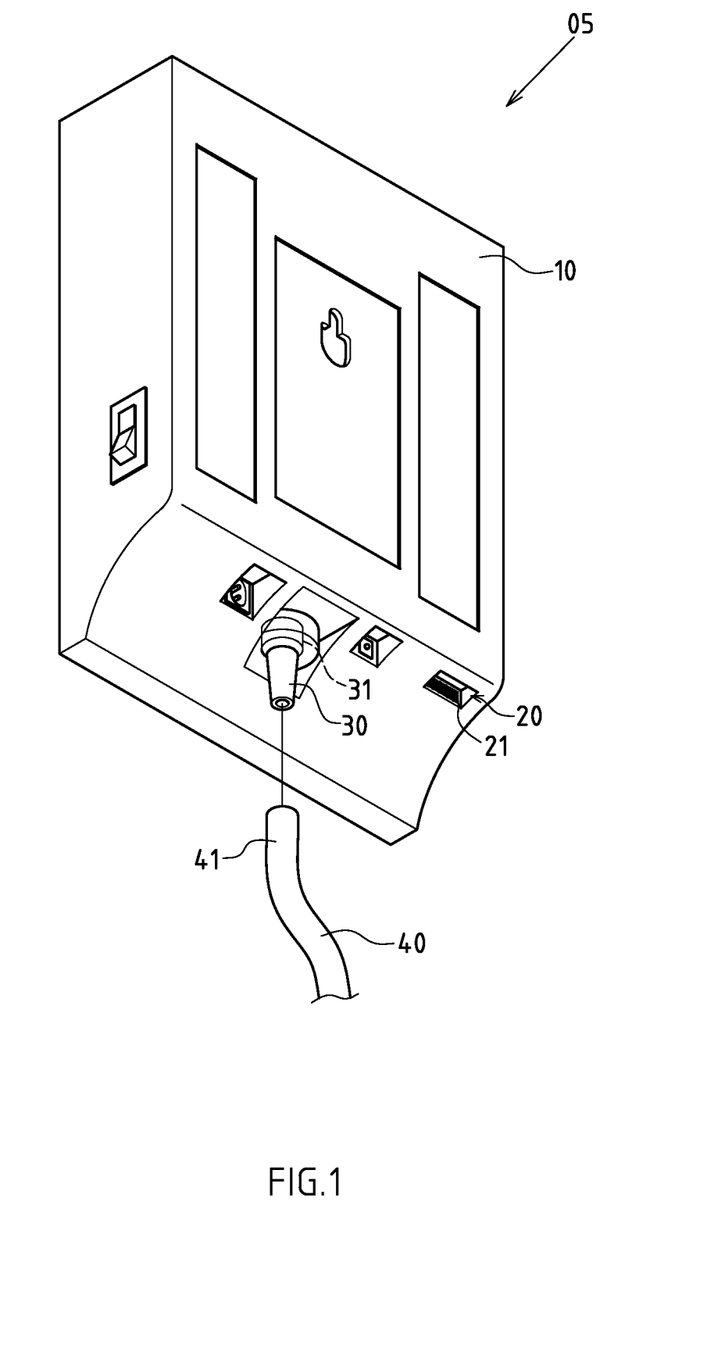
FIG. 1 is an assembled perspective view of the ozone supply unit of the present invention.
Figure 2:
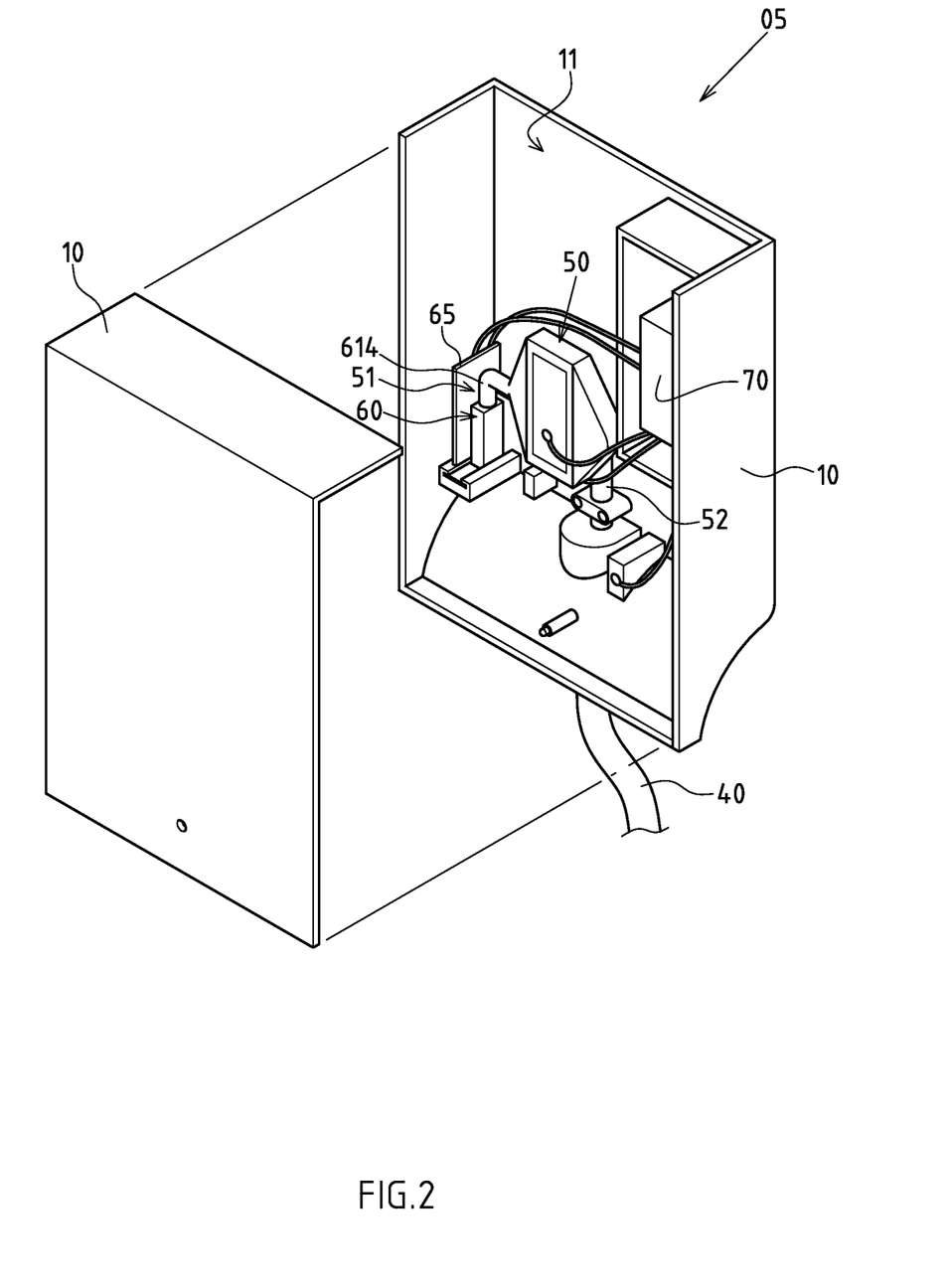
FIG. 2 is a perspective view of the present invention showing the internal structure of the ozone supply unit.
Figure 3:
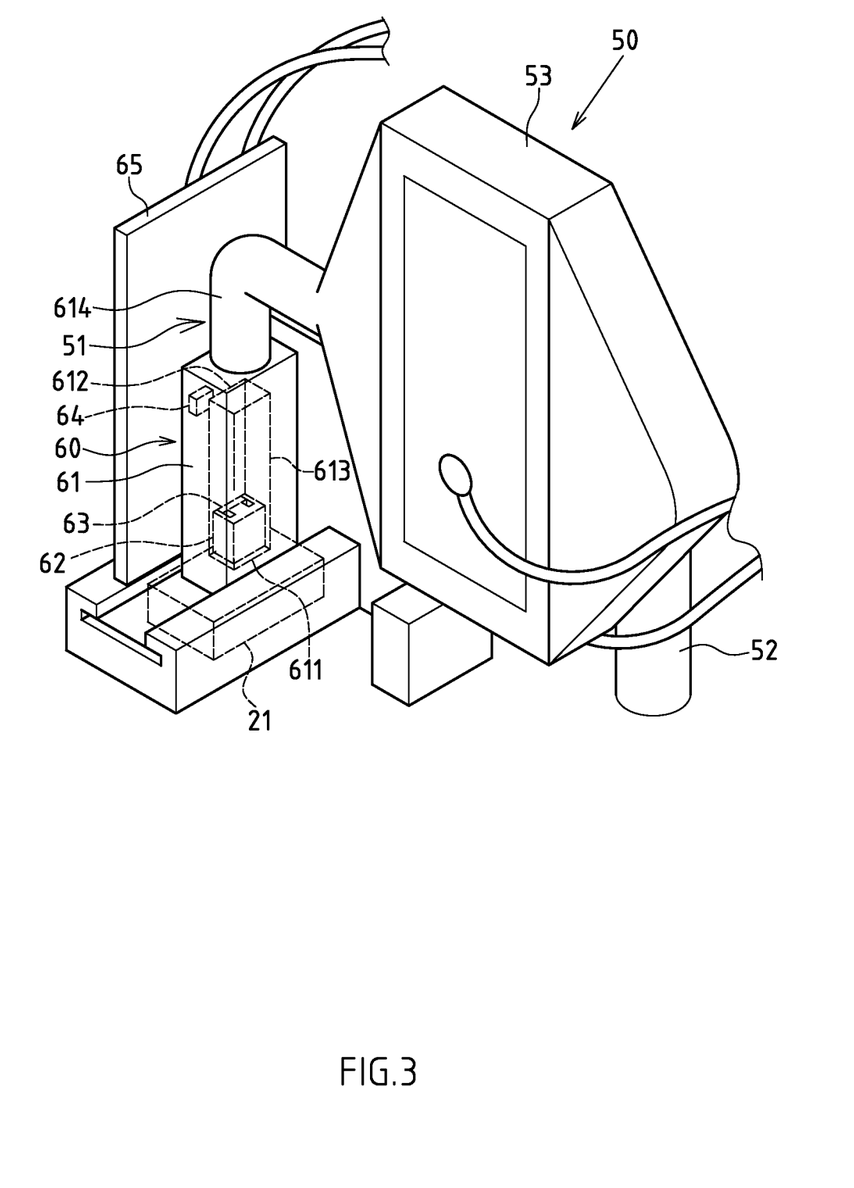
FIG. 3 is an enlarged perspective view of the zone generator and air induction member of the present invention.
Figure 4:
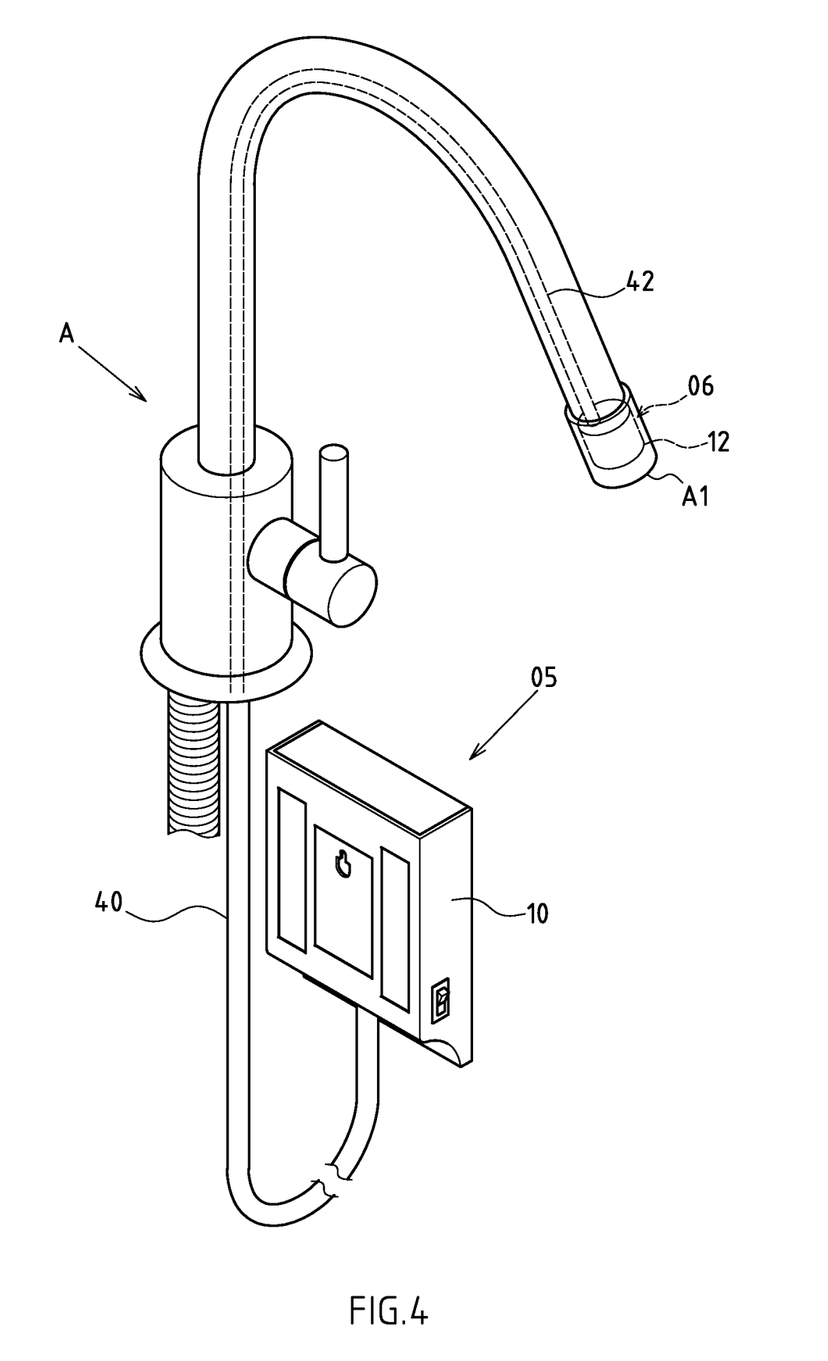
FIG. 4 is a perspective view of the preferred embodiment of the present invention.

Based upon above-specified structural design, the present invention is operated as follows:

Referring to FIGS. 1 and 3, a filter assembly 21 is arranged on the air inlet portion 20 of the housing 10, and preferably made of sponge.

Figure 5:
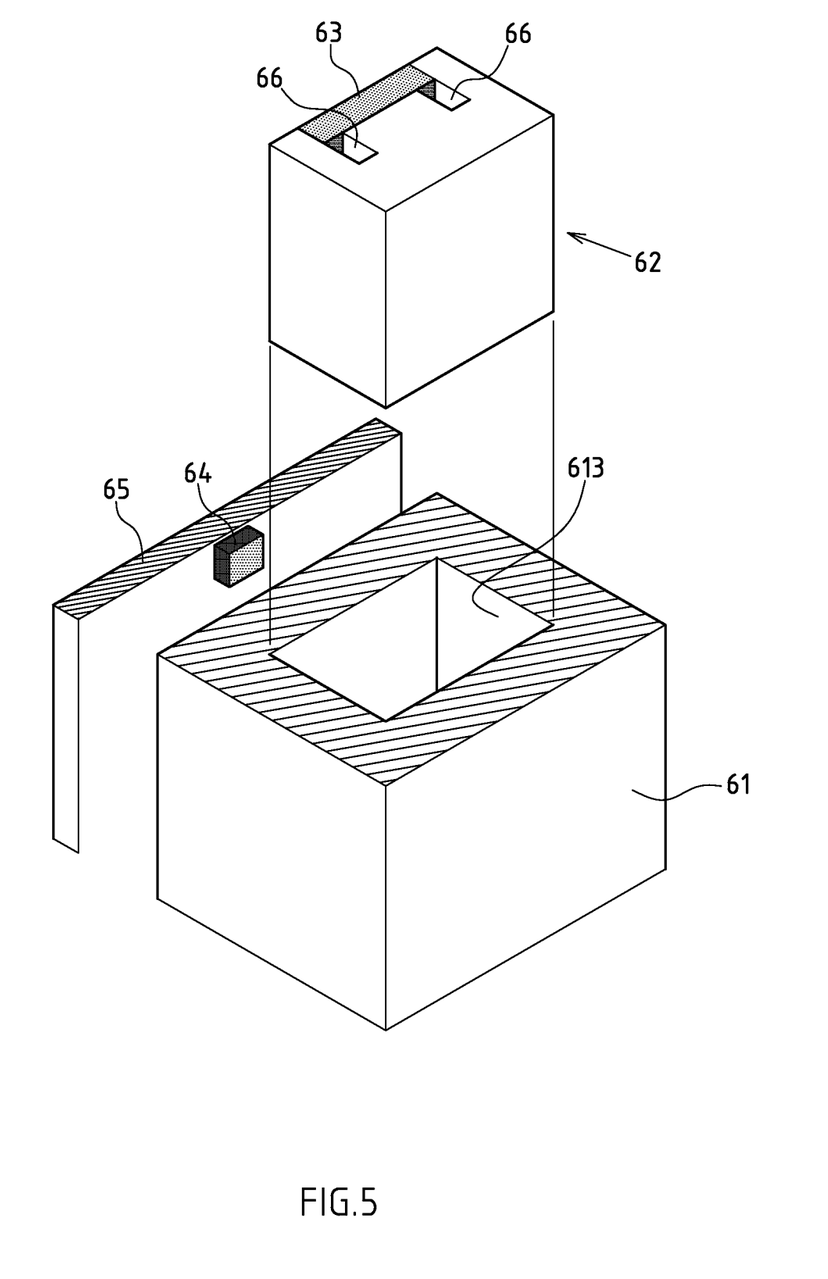
FIG. 5 is an exploded perspective view of the active magnetic inductor of the present invention.

Referring to FIG. 5, the cross section of the guiding section 613 of the guiding pipe 61 is set into rectangular, square, elongated and polygonal patterns. The cross section of the active magnetic inductor 62 is mated with that of the guiding section 613, so that lifting state of the active magnetic inductor 62 could be positioned securely and the magnetic body 63 on the active magnetic inductor 62 could be oriented normally towards the Hall component 64.

Figure 6:
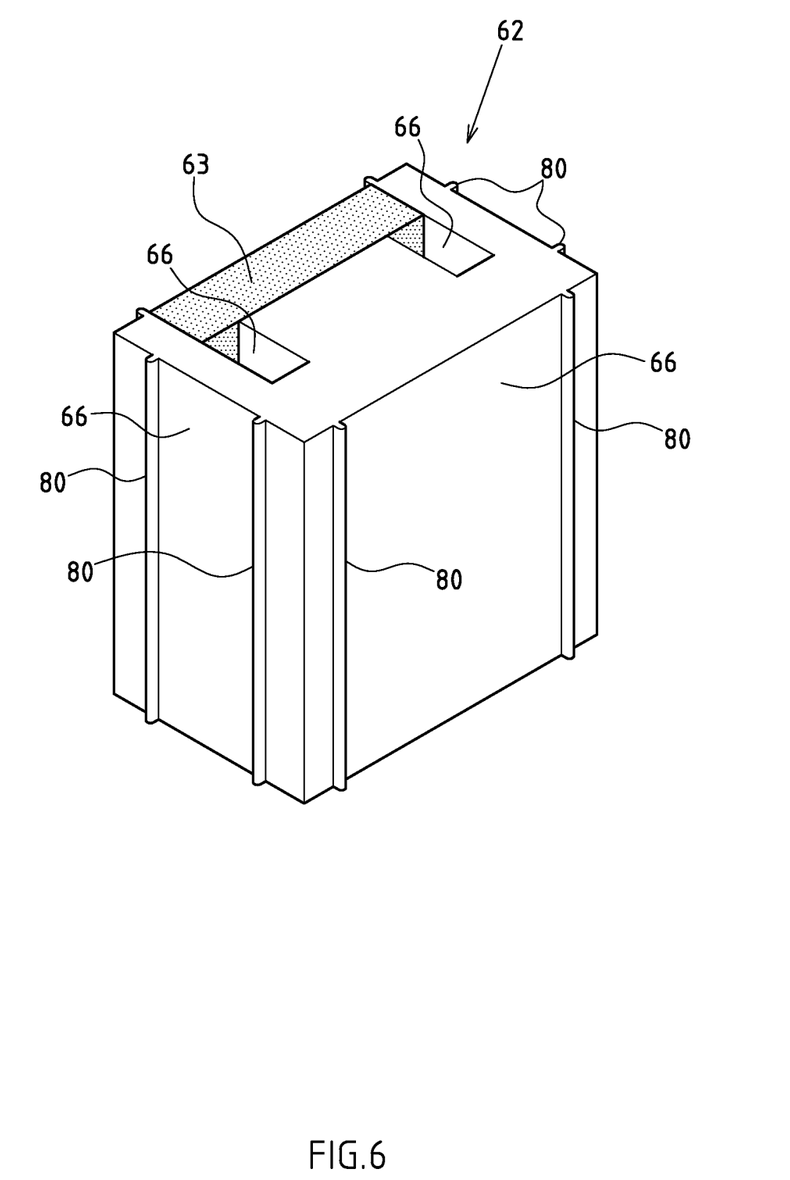
FIG. 6 is a perspective view of another preferred embodiment of the active magnetic inductor of the present invention.
Figure 7:
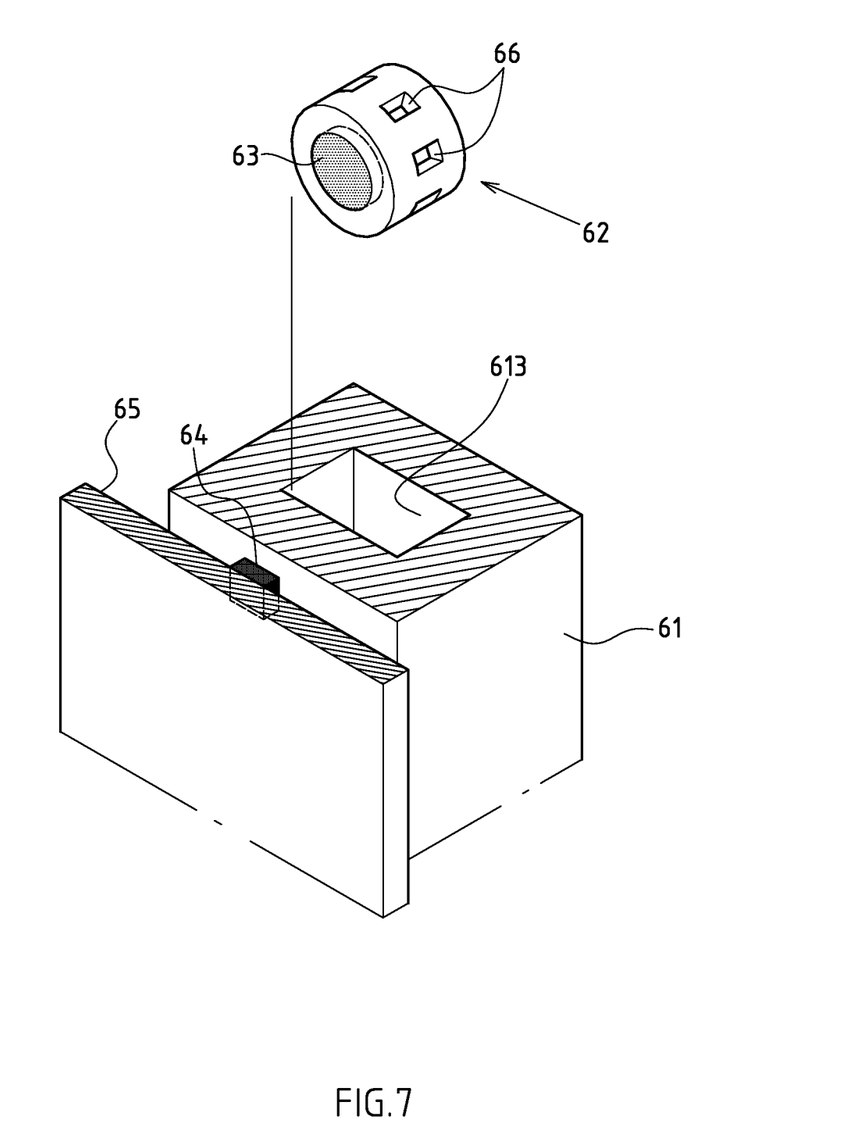
FIG. 7 is a perspective view of another preferred embodiment of the active magnetic inductor of the present invention.
Figure 8:
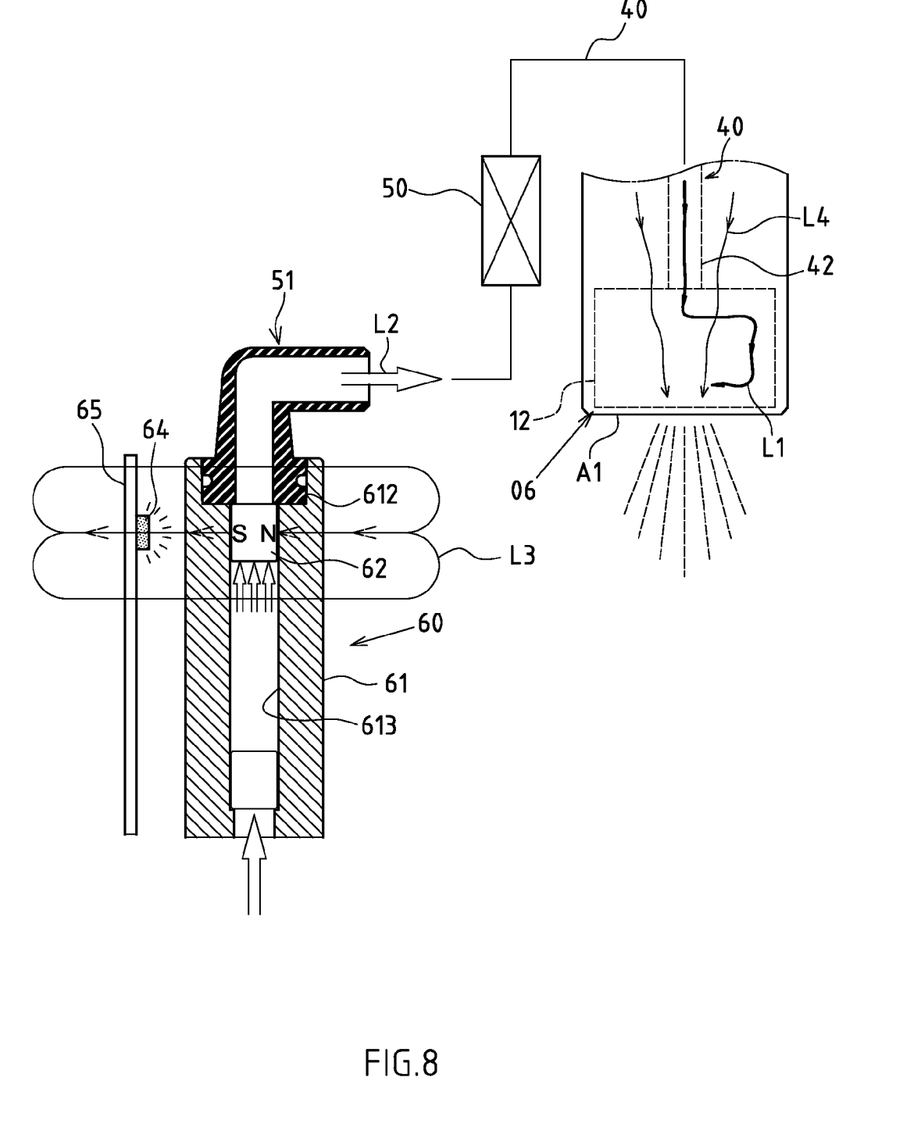
FIG. 8 is an actuating view of the ozone supply unit of the present invention.
Figure 9:
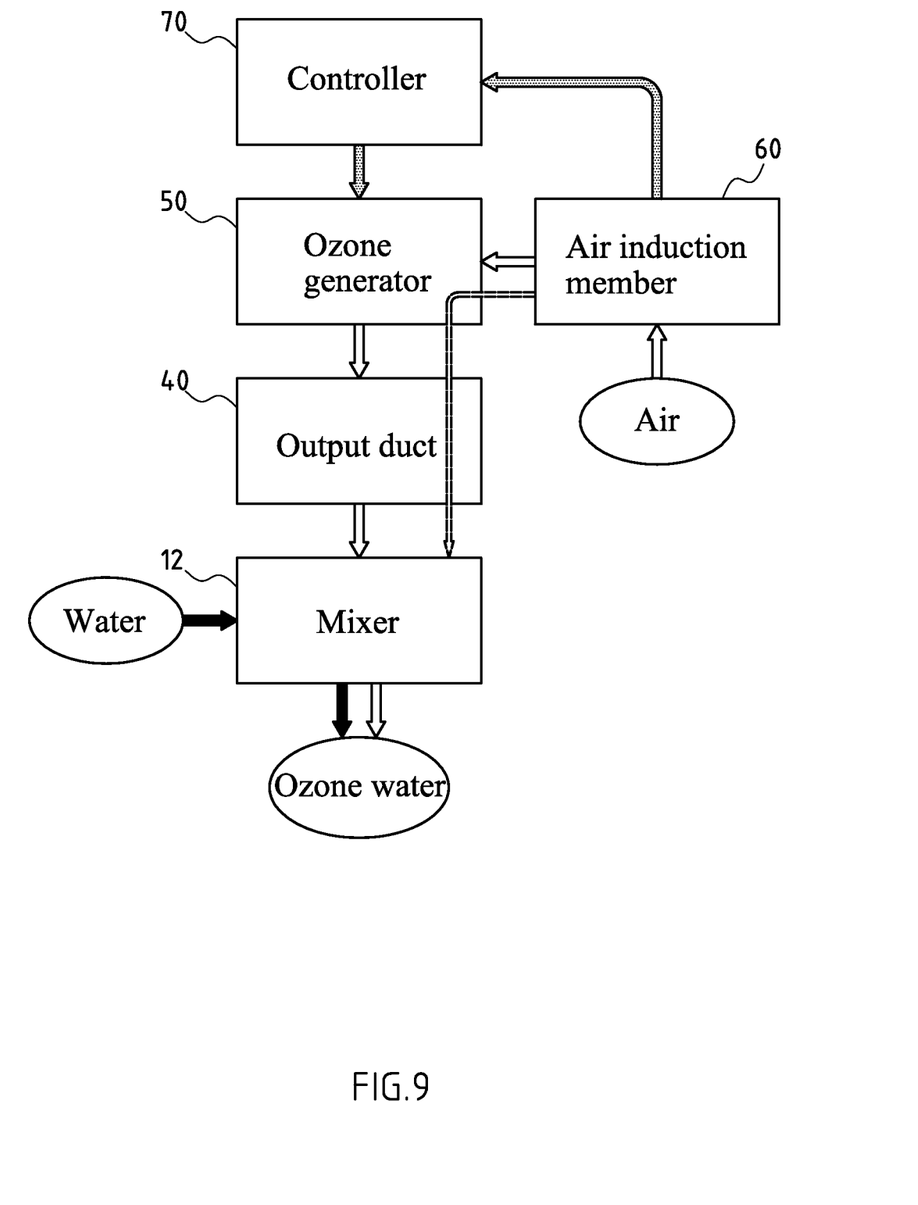
FIG. 9 is a block chart of the present invention showing the operating and connecting relationship of components of the ozone supply unit.

Referring to FIG. 7, the active magnetic inductor 62 is fitted with through-type ventilating portions 66, which are formed by penetrating the through-holes of the active magnetic inductor 62. Or, referring to FIG. 6, spaced ribs 80 are formed on the periphery of the active magnetic inductor 62, then said ventilating portions 66 are formed by the space between various spaced ribs 80. Moreover, the spaced ribs 80 come into contact with the guiding section 613 of the guiding pipe 61, thereby reducing the frictional resistance of the active magnetic inductor 62 in lifting state, and enabling more smooth lifting of the active magnetic inductor 62.

Referring also to FIG. 7, said active magnetic inductor 62 is designed into a columnar pattern viewed from its appearance.

Next, the working condition of the present invention is described below:

FIGS. 2-4 and 8 and 9 depict preferred embodiments of the present invention in service state, wherein the preset target 06 for the ozone is fitted with a mixer 12 at water outlet A1 of existing faucet A. The mixer 12 is a mixing element of water and air, which is connected with the extension end 42 of the output duct 40 of the ozone supply unit 05 disclosed in the present invention. Thus, when the user opens the faucet A to guide water from the water outlet A1 (shown by arrow L1 in FIG. 8), the mixer 12 could yield drainage effect to discharge air in the output duct 40 from the air guiding portion 51 of the ozone generator (shown by arrow L2 in FIG. 8), such that the output duct 40 generates a negative pressure state, and the active magnetic inductor 62 in the guiding section 613 of the guiding pipe 61 is driven into a floating state. Furthermore, the magnetic field generated by the magnetic body 63 (shown by arrow L3 in FIG. 8) could generate an induction signal together with the Hall component 64. When the controller 70 receives the induction signal of the Hall component 64, the ozone generating portion 53 of the ozone generator 50 is activated, so that the ozone generating portion 53 could generate ozone, which is discharged through the output duct 40 along with water (shown by arrow L4 in FIG. 8). To the contrary, when water flow stops, the negative pressure state could be removed and the active magnetic inductor 62 is reset; when the controller 70 fails to receive induction signal from the Hall component 64, the ozone generating portion 53 of the ozone generator 50 is disabled. With this structural design, it is possible to improve the shortcomings of prior art that the induction-operated control structure is arranged in the water supply passage, but often blocked or even disabled due to impurities and dirt in water.

Moreover, the preset target 06 for the ozone could also be assembled into a venturi at the water inlet of an existing faucet, then the drainage effect could be generated by the pressure difference from said venturi such that the output duct 40 could generate negative pressure similarly.

I claim:

1. A gaseous fluid-operated ozone supply apparatus comprising:
   a housing having a hollow holding space;
   an air inlet portion positioned externally on or internally of said housing at a location, said air inlet portion suitable for guiding external air;
   an ozone outlet positioned at another location on the housing, said ozone outlet suitable for producing an ozone output, said ozone outlet having a check valve therein, said check valve suitable for causing a unidirectional flow of ozone; an output duct having a coupling end and an extension end, said coupling end connected to said ozone outlet, said extension end extendable to a desired destination for the ozone, the desired destination suitable for guiding a stream of the ozone such that said output duct generates a negative pressure;
   an ozone generator positioned in said holding space of said housing, said ozone generator suitable for generating ozone, said ozone generator having an air guiding portion and an ozone discharging portion and an ozone generating portion, said ozone generating portion positioned between said air guiding portion and said ozone discharging portion, said ozone discharging portion connected to said ozone outlet;

an air induction member positioned between said air inlet portion and said ozone generator, said air induction member comprising:
- a guiding pipe positioned in a vertical orientation, said guiding pipe having a lower inlet end and an upper outlet end and a guiding section positioned between said lower inlet end and said upper outlet end, said upper outlet end being connected to said air guiding portion of said ozone generator via a connecting tube, said lower inlet end connected to said air inlet portion;
- an active magnetic inductor liftably positioned in said guiding section of said guiding pipe, said active magnetic inductor having a magnetic body positioned at one side thereof, said active magnetic inductor being driven into a floating state when said output duct is in a negative pressure state;
- an induction circuit board having a Hall component, said induction circuit positioned at one side of said guiding pipe, said Hall component positioned at one side of said induction circuit board, said magnetic body being aligned with said Hall component when said active magnetic inductor is in the floating state such that said Hall component generates an induction signal; and
- a controller positioned in said holding space of said housing, said controller electrically connected to said induction circuit board and to said ozone generator, said controller suitable for enabling startup of said ozone generating portion of said ozone generator when receiving the induction signal of said Hall component, said controller disabling said ozone generating portion of said ozone generator when the induction signal is not received.

2. The gaseous fluid-operated ozone supply apparatus of claim 1, said guiding section of said guiding pipe having a cross-section of a rectangular or square or elongated or a polygonal shape, said active magnetic inductor having a cross-section mated with said cross-section of said guiding section such that said magnetic body of said active magnetic inductor is normally oriented toward said Hall component.

3. The gaseous fluid-operated ozone supply apparatus of claim 1, the desired destination for the ozone is a mixer at a water outlet of a faucet, said mixer sleeved to said extension end of said output duct.

4. The gaseous fluid-operated ozone supply apparatus of claim 1, said active magnetic inductor being fitted with through-type ventilating portions.

5. The gaseous fluid-operated ozone supply apparatus of claim 4, said ventilating portions being formed by penetrating through-holes of said active magnetic inductor.

6. The gaseous fluid-operated ozone supply apparatus of claim 4, said active magnetic inductor having spaced ribs formed on a periphery thereof, said ventilating portions defined by spaces between the spaced ribs.

7. The gaseous fluid-operated ozone supply apparatus of claim 6, said spaced ribs contacting said guiding section of said guiding pipe so as to reduce frictional resistance of said active magnetic inductor when lifted.

8. The gaseous fluid-operated ozone supply apparatus of claim 1, said air inlet portion having a filter assembly arranged thereon.

* * * * *